(12) United States Patent
Elserougi et al.

(10) Patent No.: US 8,656,229 B2
(45) Date of Patent: Feb. 18, 2014

(54) SYSTEM AND METHOD FOR EXECUTION OF USER-DEFINED INSTRUMENT COMMAND SEQUENCES USING MULTIPLE HARDWARE AND ANALYSIS MODULES

(75) Inventors: Nabil Ayoub Elserougi, San Jose, CA (US); Thomas Toldborg Andersen, Brentwood, CA (US); Roman Schilter, Sunnyvale, CA (US)

(73) Assignee: Litepoint Corporation, Sunnyvale, CA (US)

( * ) Notice: Subject to any disclaimer, the term of this patent is extended or adjusted under 35 U.S.C. 154(b) by 0 days.

(21) Appl. No.: 13/488,742

(22) Filed: Jun. 5, 2012

(65) Prior Publication Data
US 2013/0326290 A1     Dec. 5, 2013

(51) Int. Cl.
*G01R 31/319* (2006.01)
*G01R 31/40* (2006.01)

(52) U.S. Cl.
USPC .......................................... 714/712; 714/738

(58) Field of Classification Search
None
See application file for complete search history.

(56) References Cited

U.S. PATENT DOCUMENTS

| | | | |
|---|---|---|---|
| 7,188,041 B1 * | 3/2007 | Secatch | 702/108 |
| 8,138,778 B1 * | 3/2012 | Smith | 324/756.02 |
| 2004/0039977 A1 * | 2/2004 | Cullen et al. | 714/742 |
| 2005/0176376 A1 | 8/2005 | Liu | |
| 2006/0212764 A1 * | 9/2006 | Slobodnik et al. | 714/718 |
| 2007/0159199 A1 | 7/2007 | Talwar et al. | |
| 2008/0287117 A1 | 11/2008 | Olgaard | |
| 2009/0199047 A1 * | 8/2009 | Vaitheeswaran et al. | 714/47 |
| 2010/0123471 A1 | 5/2010 | Olgaard | |
| 2012/0331343 A1 * | 12/2012 | Norton et al. | 714/25 |

FOREIGN PATENT DOCUMENTS

KR    10-0878199 B1    1/2009

OTHER PUBLICATIONS

International Search Report Mailed Aug. 21, 2013 for PCT Application No. PCT/US2013/037530.
Written Opinion Mailed Aug. 21, 2013 for PCT Application No. PCT/US2013/037530.

* cited by examiner

*Primary Examiner* — Ajay Bhatia
*Assistant Examiner* — Dipakkumar Gandhi

(57) ABSTRACT

A system and method for the execution of a program comprises a user-defined sequence of standard hardware and analysis module commands of an instrument, in the context of a tester comprising a plurality of VSAs and VSGs, or other hardware measurement modules types, where the coordination of command execution and resource availability is built into the system as an inherent part of its overall architecture. As such, the commands are the same as those ordinarily executed in piecemeal fashion, but are now automatically and sequentially executed in an atomic and deterministic manner through the coordinated interaction of embodiments of the invention.

12 Claims, 5 Drawing Sheets

SYSTEM AND METHOD FOR EXECUTION OF USER-DEFINED INSTRUMENT COMMAND SEQUENCES USING MULTIPLE HARDWARE AND ANALYSIS MODULES

TECHNICAL FIELD

The present invention relates generally to systems and methods for testing electronic equipment. More particularly, it relates to improvements in systems and methods for testing wireless devices using test platforms consisting of hardware, firmware and/or software components where a plurality of hardware modules and analysis modules can operate concurrently.

BACKGROUND

Many of today's handheld devices make use of wireless "connections" for telephony, digital-data transfer, geographical positioning, and the like. Despite differences in frequency spectra, modulation methods and spectral power densities, the wireless connectivity standards use synchronized data packets to transmit and receive data. In general, all of these wireless capabilities are defined by industry-approved standards (e.g., IEEE 802.11 and 3GPP LTE) which specify the parameters and limits to which devices having those capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals (e.g., vector signal analyzers or VSAs) and to send signals (e.g., vector signal generators or VSGs) that subscribe to the industry-approved standards so as to determine whether a device is receiving and processing the wireless signals in accordance with its standards.

There are testers in use that have a single VSA and VSG and are designed to test the physical characteristics associated with one wireless standard. There are also testers that have a plurality of VSAs and VSGs and are designed to concurrently test wireless physical characteristics of two or more different and non-interfering standards.

Testers having a plurality of VSAs and VSGs, and designed for concurrent testing, are typically controlled by external or internal control subsystems that, in turn, execute a user-defined test program. However, such testers are not designed to perform as hardware real-time test-programs or measurement processors, that is, they are not designed to execute an arbitrarily user-defined sequence of standard instrument commands in an atomic and deterministic manner across all of the independent modules of a tester, automatically, through internally coordinated interactions of the tester firmware and hardware components for direct real-time interaction with the device under test.

If a tester comprising a plurality of VSAs and VSGs and analysis modules could be outfitted with a system and method for coordinating the interactions of its firmware and hardware components such that it could automatically execute commands across its independent modules in an atomic and deterministic fashion, then the tester would be able to execute piecemeal (e.g., one-off) commands and measurements or a sequence of measurement-related commands in the same atomic and deterministic manner.

A tester equipped, as described, could be programmed by simply giving it a sequence of the standard measurement and analysis commands of the instrument, in any order. This, in turn, could make programming such a real-time, deterministic measurement system simpler and faster, and result in increased testing efficiency and lower overall test cost.

SUMMARY

It is, therefore, an object of the present invention to overcome the deficiencies of the prior art to include a system and method for the execution of a program comprising a user-defined sequence of standard hardware and analysis module commands of an instrument, in the context of a tester comprising a plurality of VSAs and VSGs, or other types of hardware analysis and measurement modules, where the coordination of command execution and resource availability is built into the system as an inherent part of its overall architecture. As such, the commands are the same as those ordinarily executed in piecemeal fashion, but are now automatically and sequentially executed in an atomic and deterministic manner through the coordinated interaction of embodiments of the invention.

There has thus been outlined, rather broadly, certain embodiments of the invention in order that the detailed description of the invention herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the concept upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments but are for explanation and understanding only.

DETAILED DESCRIPTION OF EMBODIMENTS

The invention will now be described with reference to the drawing figures in which like reference numerals refer to like parts throughout. The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, terms "circuit" and "circuitry" may include either a single component or a plurality of components which are either active and/or passive and are connected or otherwise coupled together (e.g., as one or more integrated circuit devices) to provide the described function.

For purposes of the present invention, the term "signal" may refer to one or more currents, one or more voltages, or a data signal. A signal may incorporate any stream of quantities in time or spatial sequence. Signals may be categorized to the fields of communications, signal processing and to electrical engineering more generally. Signals may contain and transport information in coded form like modulation, in which case, the actual quantities are finally not used, but are decoded in a detector or demodulator. In the physical realm, any quantity measurable through time or over space can be taken as a signal. Any set of human information or machine data can also be taken as a signal.

For purposes of the present invention, the term "FIFO" is an acronym meaning First In, First Out, an abstraction related to ways of organizing and manipulating data relative to time and prioritization. This expression describes the principle of a queue processing technique or servicing conflicting demands by ordering process by first-come, first-served (FCFS) behavior.

For purposes of the present invention, the term "3GPP Long Term Evolution," referred to as "LTE" and marketed as "4G LTE," refers to a standard for wireless communication of high-speed data for electronic devices including, for example, mobile phones and data terminals. It is based on the Global System for Mobile Communications (GSM), originally Groupe Spécial Mobile, GSM/Enhanced Data rates for GSM Evolution (EDGE) and Universal Mobile Telecommunications (UMTS)/High Speed Packet Access (HSPA) network technologies, increasing the capacity and speed using new modulation techniques. The standard is developed by the 3GPP (3rd Generation Partnership Project) and is specified in its Release 8 document series, with minor enhancements described in Release 9. GSM (Global System for Mobile Communications, originally Groupe Spécial Mobile), is a standard set developed by the European Telecommunications Standards Institute (ETSI) to describe technologies for second generation (2G) digital cellular networks. EDGE (also known as Enhanced GPRS (EGPRS), or IMT Single Carrier (IMT-SC), or Enhanced Data rates for Global Evolution) is a digital mobile phone technology that allows improved data transmission rates as a backward-compatible extension of GSM. Universal Mobile Telecommunications System (UMTS) is a third generation mobile cellular technology for networks based on the GSM standard. Developed by the 3GPP (3rd Generation Partnership Project), UMTS is a component of the International Telecommunications Union IMT-2000 standard set and compares with the CDMA2000 standard set for networks based on the competing cdmaOne technology. UMTS employs Wideband Code Division Multiple Access (WCDMA) radio access technology to offer greater spectral efficiency and bandwidth to mobile network operators. UMTS specifies a complete network system, covering the radio access network (UMTS Terrestrial Radio Access Network, or UTRAN), the core network (Mobile Application Part, or MAP) and the authentication of users via SIM cards (Subscriber Identity Module). High Speed Packet Access (HSPA) is an amalgamation of two mobile telephony protocols, High Speed Downlink Packet Access (HSDPA) and High Speed Uplink Packet Access (HSUPA), that extends and improves the performance of existing WCDMA protocols.

For purposes of the present invention, the term "SCPI" (Standard Commands for Programmable Instruments) refers to a standard for syntax and commands to use in controlling programmable test and measurement devices. Defined with the IEEE 488.2 specification, the standard specifies a common syntax, command structure, and data formats, to be used with all instruments. SCPI commands are ASCII textual strings, which are sent to the instrument over the physical layer (e.g., IEEE-488). Commands are a series of one or more keywords, many of which take parameters, which are typically ASCII strings. However, binary formats can be used.

Within the drawing, like or related elements will have like or related alpha, numeric, or alphanumeric designators. Further, while the present invention has been discussed in the context of implementations using discrete electronic circuitry (preferably in the form of one or more integrated circuit devices), the functions of any part of such circuitry may be implemented alternatively using one or more appropriately programmed processors, depending upon the signal frequencies or data rates to be processed.

In accordance with the disclosed exemplary embodiment, a system is described and shown comprising a plurality of VSAs, VSGs and technology signal analysis modules (e.g., for GSM and LTE) that can interface and test numerous DUTs connected, for example, to a switching fabric via associated bi-directional ports. Disclosed embodiments provide that the bi-directional ports may be wired or wireless. Although the examples shown and described include two VSAs, two VSGs and two analysis modules, it will be readily apparent to those skilled in the art that the disclosed system and method may comprise more than two VSAs, VSGs and analysis modules. Furthermore, although the exemplary system and method describes and illustrates four bi-direction ports, it will also be clear to someone practiced in the art that the system and method may comprise more or less than the aforementioned four bi-directional ports. The system can also be configured with unidirectional ports. The disclosed embodiment is meant to be exemplary and should not be construed as defining the scope of the invention.

Figure 1:
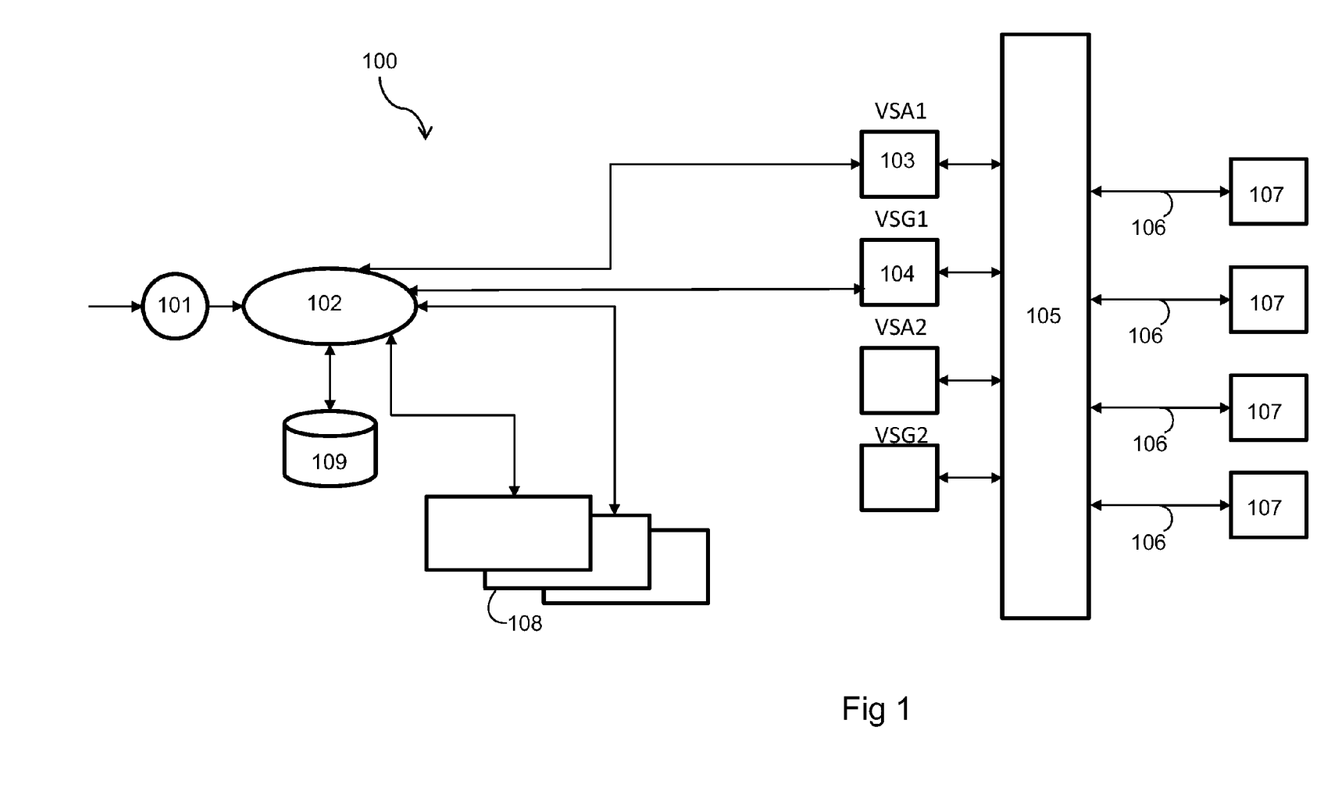
FIG. 1 is a prior-art diagram depicting a test system according to an exemplary disclosed embodiment.

Turning to FIG. 1, a prior-art test system 100 includes a basic system measurement architecture comprising a plurality of measurement processors (not shown), each with a measurement captures/results database (not shown), and a plurality of analysis modules all having access to the measurements database, a plurality of VSAs 103 and VSGs 104, an RF switch fabric 105, and a plurality of communication ports 106 that interface with a plurality of DUTs 107. Components of prior-art test system 100 are operatively configured to communicate with one another. Thus, prior-art test system 100 is shown where commands are put into test system 100 during a communications session 101. These commands are received by the measurement processor 102 which will pass on the commands to the intended hardware module (e.g., VSA1 103 and VSG1 104), and measurement processor 102 may also access related test-process data from one or more analysis modules 108 to be used or referenced to set one or plurality of parameters and/or to compare measured results against the standard's prescribed measurement range. One of the plurality of DUTs 107 connected to one of the plurality of communication ports 106) is connected to one of the plurality of hardware modules. When the DUT, through the selected port, is interfaced, e.g., to VSA1 103, the command that was entered during communications session 101 and passed on to VSA1 103 is executed. The first VSA VSA1 releases itself so the next command can be dispatched to it while it executes the current command. The results of the measurement are stored in the measurement captures/results database 109, and system 100 is now ready to accept the next measurement command during communications session 101.

Figure 2:
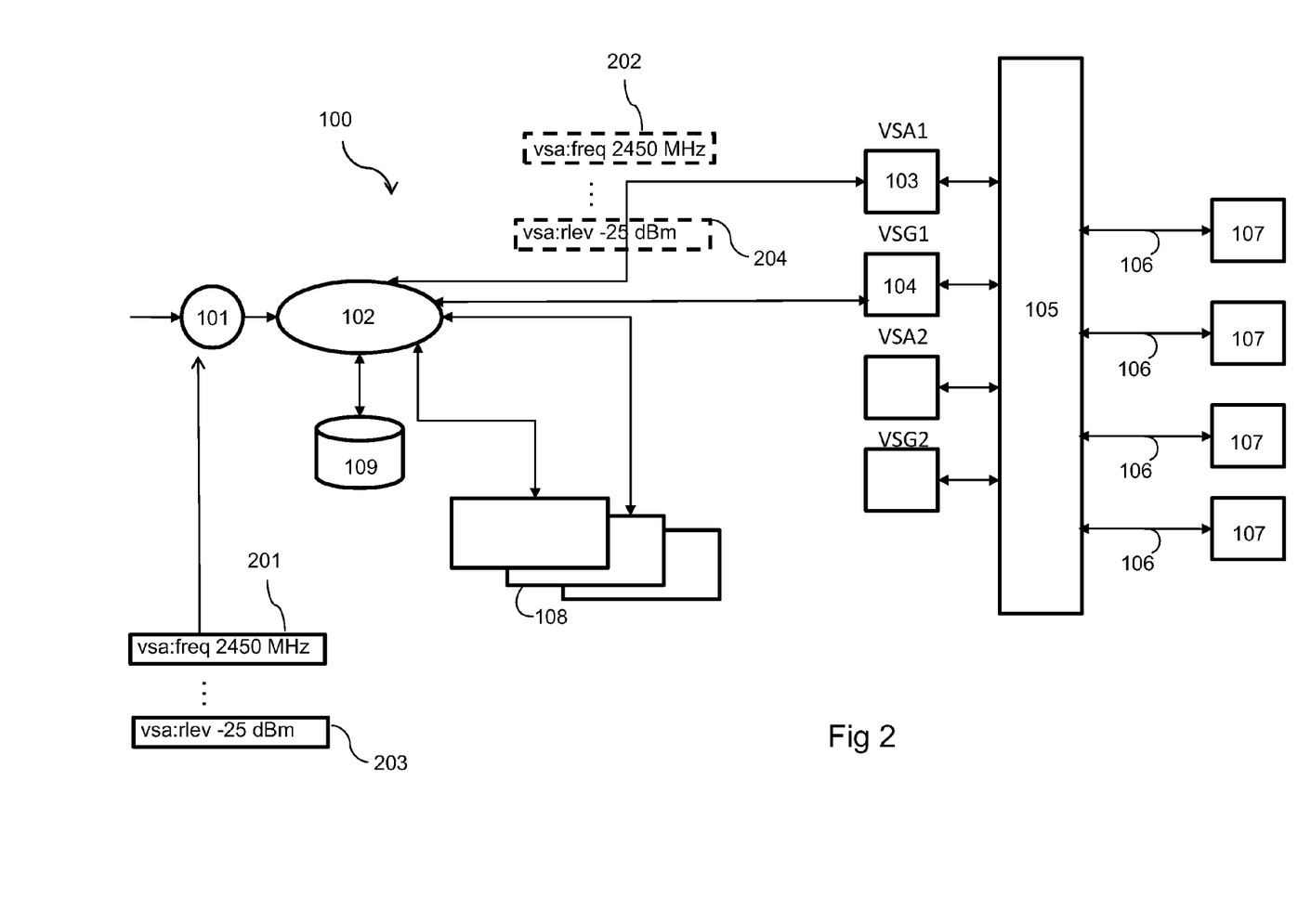
FIG. 2 illustrates the prior-art diagram of FIG. 1 showing a piecemeal execution of SCPI commands according to an exemplary disclosed embodiment.

FIG. 2 illustrates the same test system architecture as shown in FIG. 1. The basic system measurement architecture, which is prior art, is designed to process test-oriented commands, such as "vsa:freq 2450 MHz". Thus, a measurement command 202, which is written in SCPI format, is entered into the system during a communications session as shown. The command, for the sake of example, is "vsa:freq 2450 MHz." This sets the VSA's frequency to 2450 MHz. Measurement processor 102 will pass the command 202 on to the selected VSA (e.g., VSA1 103). After some amount of time, in piecemeal fashion, another SCPI command 203 is entered via any open communications session 101. Again, measurement processor 102 passes on that command 204 to the intended hardware module (e.g., VSA1 103). Note that measurement processor 102 can pass on commands to any of the plurality of hardware modules in test system 100. Thus, if the next command were addressed to a VSG (e.g., vsg:pow −36.6 dBm), it would be passed on from measurement processor 102 to the VSG hardware module (VSG1 104).

It is noted that the prior-art test system 100 of FIGS. 1 and 2 has no means for processing a sequence of commands in deterministic order across modules in hardware, and that hardware modules would likely execute commands in arbitrary cross-module order in such a case. The basic system measurement architecture is designed to execute, for example, SCPI commands in piecemeal fashion, serially into a single module, with each module executing in parallel with other modules. Commands can be dispatched and accepted independently, but dispatching of a command is blocked until a module releases itself following the pulling of a command from its command queue. Thus, while the command "vsa:freq 2450 MHz" is executed, and the VSA frequency is set for 2450 MHz, the tester can be issued another command, such as "vsa:rlev −25 dBm," where the VSA is then set to a reference level setting of −25 dBm. Now, while the VSA commands are being executed, the command "vsg:freq 2450 MHz" can be sent to the instrument and executed in parallel with the VSA command execution, and the VSG frequency is set for 2450 MHz. The VSG can be issued another command, such as "vsg:pow −45 dBm" where the VSG is now set to a power setting of −45 dBm. Each command to the VSG module is executed serially and atomically, but the commands together are not executed deterministically in time with the VSA commands. The VSA and VSG commands are executed completely independently from each other and, thus, there exists no real-time behavior across modules. Thus, this basic measurement architecture does not account for timing in one module, or across multiple modules other than guaranteeing serial execution of a hardware module's command sequences.

Figure 3:
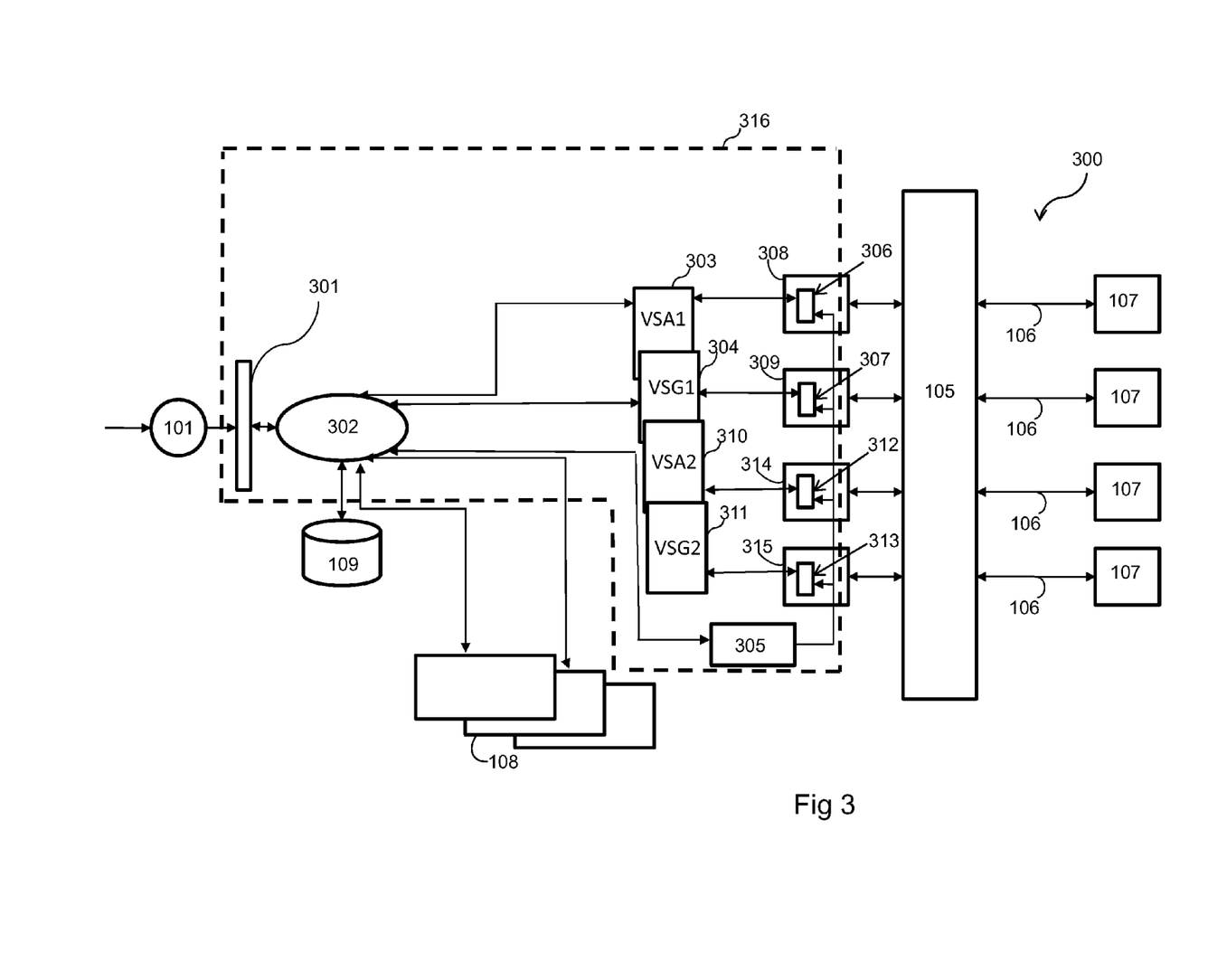
FIG. 3 illustrates a test system including sequence processing embodiments according to an exemplary disclosed embodiment.

Referring to FIG. 3, the system of FIG. 1 has been augmented with a sequence processing module 316 to provide an improved test system 300 capability of the disclosed invention. Sequence processing module 316 comprises a global resource scheduler 301, a measurement processor/sequence player 302, a plurality of hardware modules VSA1, VSG1, VSA2 and VSG2 each associated with discrete hardware interface modules (HWIMs) 303, 304, 310, and 311, respectively. Sequence processing module 316 additionally comprises hardware modules—VSA1 FIFO register module 308, VSG1 FIFO register module 309, VSA2 FIFO register module 314 and VSG2 FIFO register module 315—provided in communication with additional components of sequence processing module 316 including VSA1, VSG1, VSA2 and VSG2, respectively. VSA1 FIFO register module 308, VSG1 FIFO register module 309, VSA2 FIFO register module 314 and VSG2 FIFO register module 315 comprise FIFO registers 306, 307, 312 and 313, respectively, for loading both the sequential commands and measurement commands, as described below. Sequence processing module 316 further comprises an event register 305 operatively connected to communicate with measurement processor/sequence player 302 and FIFO registers 306, 307, 312 and 313 of VSA1 FIFO register module 308, VSG1 FIFO register module 309, VSA2 FIFO register module 314 and VSG2 FIFO register module 315, respectively. Global resource scheduler 301 may be operatively connected to receive commands from communications session 101. Measurement processor/sequence player 302 may be configured to operatively connect to and communicate with global resource scheduler 301, measurement captures/results database 109, one or more technology modules 108, hardware modules VSA1, VSG1, VSA2 and VSG2, and event register 305. Sequence processing module 316 is operatively connected to communicate with RF switch fabric 105 and a plurality of DUTs 107 such as via the plurality of communication ports 106.

Global resource scheduler 301 component (either hardware or software) determines resource availability and communicates such to the measurement processor/sequence player 302. Among other advantages, this enables multiple communications sessions to be established for concurrent operations. Disclosed embodiments of the invention include a measurement processor whose functionality is expanded to include sequence operation. (Disclosed embodiments may alternatively provide a processor that is separate from the measurement processor.) Accordingly, measurement processor/sequence player 302 is functionally imbued to process both measurement and hardware availability states. This aggregation of functions is implemented in a single integrated circuit or in two or more distinct components. As shown, the hardware modules VSA1, VSG1, VSA2 and VSG2 are each associated with, e.g., constituent parts of, discrete hardware interface modules (HWIMs) 303, 304, 310, and 311, respectively. HWIM modules 303, 304, 310, and 311 serve to store the sequence of measurement commands intended for each associated hardware module VSA1, VSG1, VSA2 and VSG2, respectively. They also store sequence processing commands that support contention-free availability of the system measurement hardware resources (e.g., VSAs and VSGs). Within the hardware modules, shown, are additional components (306, 307, 312, and 313), which are hardware FIFO registers that load both the sequential commands and measurement commands in preparation for coordinated command execution. The event register 305, is a global hardware register for storing and triggering sequence "events," herein referred to as "event register" or "Event Reg." In the disclosed embodiment, event register 305 stores the event ID associated with a particular command set of a sequence.

Figure 4:
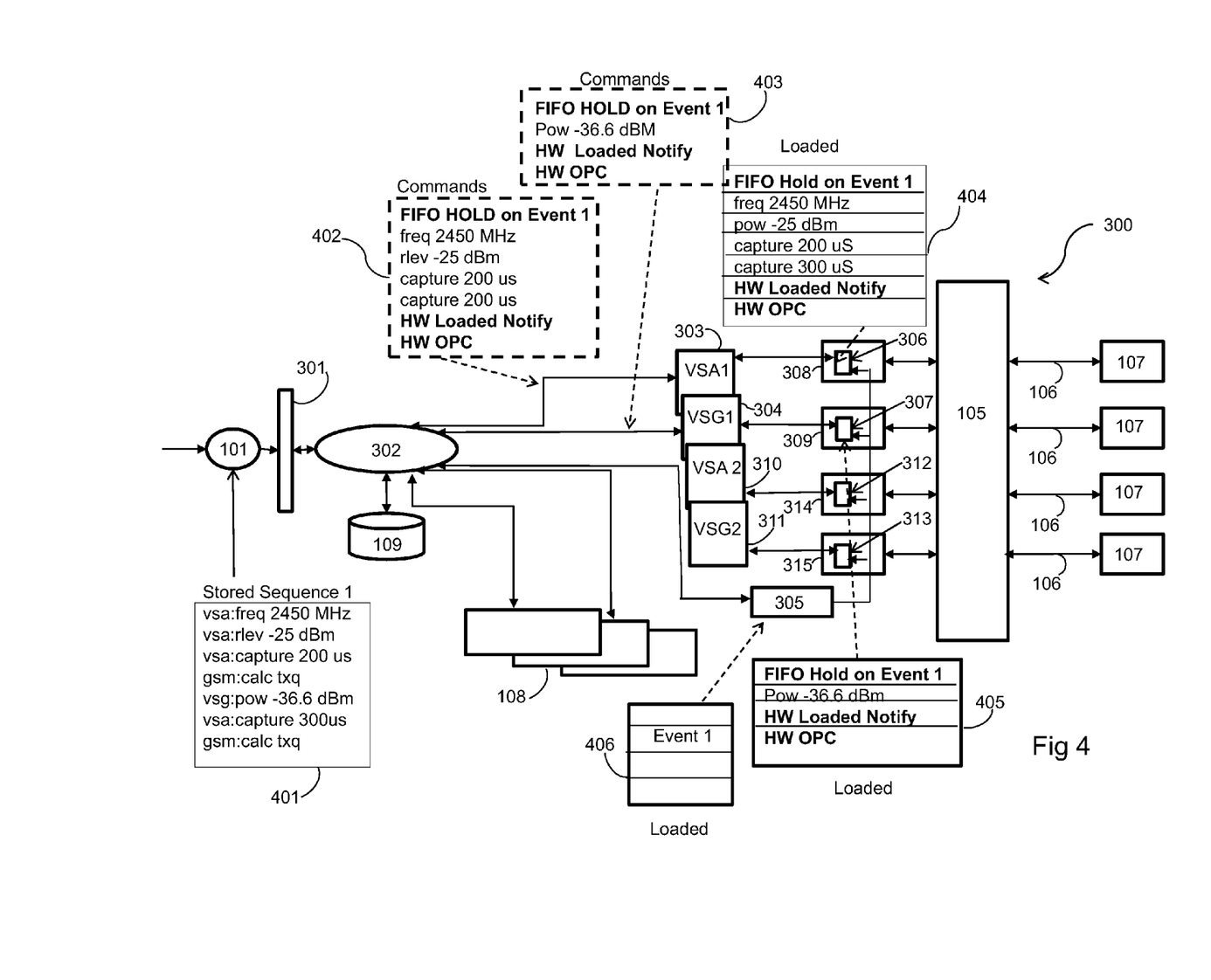
FIG. 4 illustrates the test system of FIG. 3 showing how a stored sequence of commands is parsed into commands that are loaded into technology modules and an event register according to an exemplary disclosed embodiment.

FIG. 4 illustrates the flow of measurement and sequence commands and controls of FIG. 3. A stored sequence of commands is parsed into commands that are loaded into the VSA1 FIFO register, VSG1 FIFO register, and the event register. This sets up the "Sequence 1" set of commands for execution pending the release of the "Hold on Event 1." As shown, a stored sequence of commands (e.g., Sequence 1 401) is entered into test system 300 via communications session 101. Note that this sequence need not be a stored sequence; a user may create a sequence of commands simply by entering a succession of individual measurement commands after the user has made known to test system 300 that a command sequence is being created. Once Sequence 1 401 is entered, global resource scheduler 301 will wait for needed hardware modules to be available; after which, global resource scheduler 301 will allow measurement processor/sequence player 302 to pass on the subsets of the commands that are intended for each hardware module. In this case, VSA-intended commands 402 (e.g., vsa:freq 2450 MHz) are sent to VSA1. VSG-intended commands 403 (e.g., vsg:pow −36.6 dBm) are sent to VSG1. Commands 402, 403 are received by VSA1 and VSG1 HWIMs 303 and 304, respectively, and may be passed on to the hardware modules and stored in the FIFO registers 306 and 307 of VSA1 FIFO register module 308 and VSG1 FIFO register module 309, respectively. When FIFO registers 306 and 307 are loaded with their respective intended commands 404 and 405, each issues a message to the measurement processor/sequence player 302 indicating the FIFO hardware is loaded (i.e., obeying the HW Loaded Notify command (e.g., note respective command lines in intended commands 404 and 405)). The entered command sequence is denoted as "Event 1" and stored in the event register 406. As such, test system 300 is poised to execute the sequence of commands stored in FIFO registers 306 and 307, respectively. However, in this instance, they are holding because of the first command—a sequence-control command—FIFO Hold on Event 1 405.

As shown in the exemplary embodiment of FIG. 4, as soon as all hardware modules required for a user-requested sequence execution are available, they are allocated to the waiting sequence execution request (i.e., reserved) and the sequence of commands is sent to the user-requested system's channel (a session's command communications environment) sequence player for execution. In the current embodiment, this is channel 1 of several possible independent instrument channels. The sequence player component of measurement processor/sequence player 302 separates the sequence commands flowing to VSA1 and VSG1, but first will send each of the VSA1 and VSG1 modules a "FIFO HOLD on Event 1" message (note that Event 1 corresponds to channel 1 of the several channels), which will be stored in each of the VSA1 and VSG1 FIFO registers as shown. Hence, each module's sequence commands are then sent to and stored in FIFO registers 306 and 307 of VSA1 FIFO register module 308 and VSG1 FIFO register module 309, respectively, as shown, and "Event 1" is stored in the Global Event Register 305. When all commands have been stored into the VSA1 FIFO register module 308 and VSG1 FIFO register module 309, the sequence player will store a HW OPC command into each intended command 404 and 405 of FIFO registers 306 and 307. In return, measurement processor/sequence player 302 receives the hardware FIFO-loaded notification (e.g., the result of executing HW Loaded Notify) from each of the VSA1 and VSG1 modules, and test system 300 is now poised to carry out this sequence of commands, but is holding per FIFO HOLD on Event 1.

Figure 5:
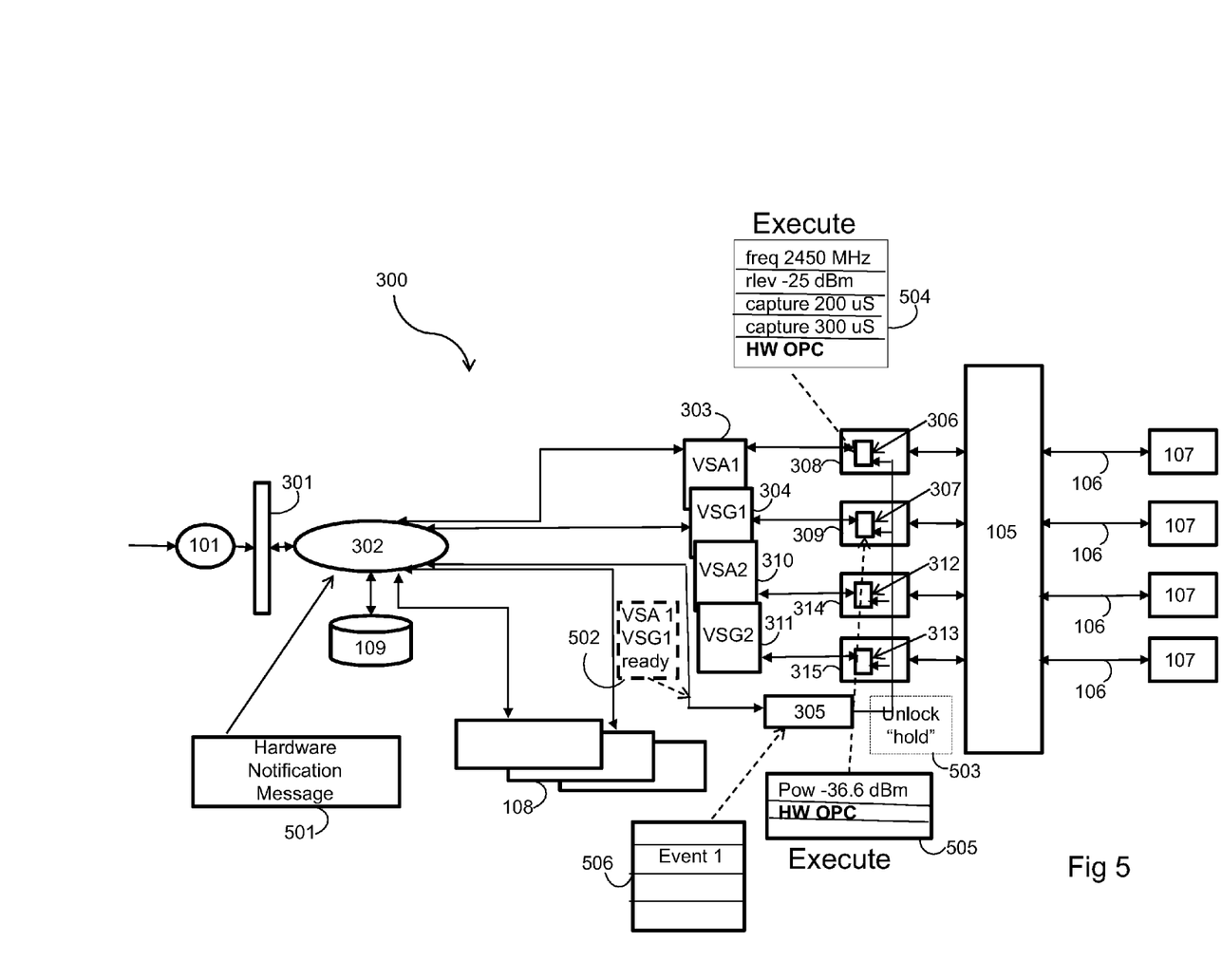
FIG. 5 illustrates an exemplary operation of the test system of FIG. 3 of the sequence player and execution of sequence commands to assign hardware modules for use by other commands or sequences according to an exemplary disclosed embodiment.

FIG. 5 illustrates the command execution of test system 300. When FIFO registers 306 and 307 have been loaded, measurement processor/sequence player 302 is informed via messages, and, in turn, sends a "hold release" message to the event register 305. That allows the execution of Sequence 1 commands to proceed, and, upon completion, for the "operation complete" message to be sent back to global resource scheduler 301, thus enabling the global resource scheduler to assign the hardware modules for use by other commands or sequences, as needed.

In operation, notification messages 501 (see FIG. 5) are accumulated from each hardware module in measurement processor/sequence player 302, which when all messages have been received sends a "VSA1, VSG1 ready" message 502 to the event register 305. This signifies that Event 1 506 is primed, and the sequence control command "FIFO Hold on Event 1" (e.g., see FIG. 4) is complete, allowing intended commands 504 and 505 of respective FIFO registers 306 and 307 to execute (i.e., unlock "hold" 503) the stored sequence of measurement and control commands. While these commands are being executed, the results are stored in measurement captures/results database 109, and measurement processor/sequence player 302 receives a hardware operation complete message ("HW OPC" of intended commands 504 and 505) indicating the availability of VSA1 and VSG1. A message is sent from measurement processor/sequence player 302 to global resource manager 301 to indicate Event 1 sequence is complete. This, in turn, allows a next sequence, which may be queued up in HWIMs 303, 304, 310 and/or 311, to be loaded to the hardware module FIFO registers 306, 307, 312 and/or 313 and to proceed to a next command sequence execution (e.g., Event Sequence 2).

With reference to the disclosure and corresponding drawings, it is important to point out that the prior art (e.g., as depicted in FIG. 1) has no way of processing a sequence of measurement commands. It is up to the user to determine when resources are likely to be available, and the commands are entered in piecemeal fashion. In contrast, the embodiments of FIGS. 3-5 provide an improved test system 300 capable of processing a sequence of commands based on its own closed-loop sequence processing functionality. As such, the user does not need to know anything about resource availability or timing. All of the logistical functions typically associated therewith are carried out by the disclosed system using its own internal sequence processing capabilities. Whole test programs, made up of command sequences, can be put together simply by making a sequence of simple testing protocols such as SCPI commands. This improves test program development by making it easier, faster and less costly, and enables deterministic in time cross-module-function aggregation for atomic real-time operation. This turns separately functioning modules into a holistic tightly-coupled system "on the fly" for the duration of the sequence.

For example, when a channel's sequence player releases the Event-Register-stored Event 1, unlocking "hold" 503 on Event 1, test system 300 triggers intended commands 504 and 505 to simultaneously begin executing each of their respective commands loaded in respective FIFO registers 306 and 307; and, the sequence is executed across all requested hardware modules on the specified channel without requiring the user to detect availability, schedule, synchronize or manage the underlying hardware module coordination for executing the assembled sequence of commands. The user simply chooses and stores the desired instrument-level command sequence, selects the desired channel, and test system 300 will execute the sequence as described. The simultaneous start of the pending hardware operations across the multiple independent hardware FIFOs with the event "hold" release, along with all the sequence commands having been pre-loaded in all the hardware FIFOs, plus the fact that each of the commands will execute completely, in accordance with the hardware timing of the global system clock, guarantee the time deterministic execution of the user's desired command sequence for direct real time behavior with the DUT without continuous user program interaction on an instruction-by-instruction basis. The fact that the user can use most any of the hardware, signal analysis and other non-hardware commands of the instrument in any order on any module to create the measurement sequence, allows the user to create any desired measurement program that directly interfaces with the device under test. The user is not limited only to specified hard-wired measurement sequences. Thus, the disclosed invention is essentially an atomic and deterministic measurement processor with the command of the instrument set as the "instruction set."

As soon as each of the VSA1 and VSG1 command sequences are finished executing, the FIFO registers associated with respective VSA and/or VSG resources attending that sequence will each execute the previously loaded "hardware operation complete (HW OPC)" commands, thereby indicating the hardware operations are complete and the module hardware is available. The HW OPC message moves to the measurement processor/sequence player 302 and is stored there, awaiting all of the sequence's hardware modules to send HW OPC reports. Once all HW OPC reports are received, the hardware modules in global resource scheduler 301 are simultaneously released to make them immediately available for other tasks waiting for execution—whether individual commands or other command sequences. If the tasks are waiting to use other channels (in the disclosed example of FIG. 5, this would be channel 2 or higher) their required hardware will be reserved along with the waiting task dispatched to that channel, repeating the described cycle. The fact that all modules required for the user-defined measurement sequence are reserved and released simultaneously and the fact that the user-defined sequence runs exclusively in a single measurement channel is what allows the user to essentially define a customized "instrument" for the duration of the measurement. The disclosed embodiment, therefore, enables a highly precise measurement to be configured and executed directly with the device under test without further intervention or coordination, essentially turning the instrument into a measurement "processor."

Test system 300 is configured to enable channel 1 to continue to execute analysis and non-hardware module commands once data, if any, is returned from the hardware. Accordingly, test system 300 will also store resulting data in its database. Test system 300 will continue immediate and parallel execution of hardware, analysis and non-hardware commands until all the user-defined sequence commands are completed. At that point, channel 1 will declare the sequence execution task complete and immediately begin processing the next-pending user task that is requesting use of such channel, and repeating the process, as described.

Disclosed global resource scheduler 301 is a key component in the locking and unlocking of input pathways to system channels and modules based on instantaneous availability of in-use resources and the resources required for incoming user tasks. The locking and unlocking is a necessary function of the disclosed coordinated system and method to guarantee the system uses simple, efficient and timely aggregation of desired system components and atomic execution of all of the user-defined sequence commands across all of its required independent modules in the presence of other users vying for the system's resources. Global resource scheduler 301 ensures system resources are immediately utilized when available without the user program having to manage system resources. It does this using a first come/first serve fair scheduling algorithm and may be implemented in a variety of ways commonly known in the art.

The system, as described in the present technique or any of its components, may be embodied in the form of a computer system. Typical examples of a computer system include a general-purpose computer, a programmed microprocessor, a microcontroller, a peripheral integrated circuit element, and other devices or arrangements of devices that are capable of implementing the steps that constitute the method of the present technique.

The computer system comprises a computer, an input device, a display unit, and/or the Internet. The computer further comprises a microprocessor. The microprocessor is connected to a communication bus. The computer also includes a memory. The memory may include random access memory (RAM) and read only memory (ROM). The computer system further comprises a storage device. The storage device can be a hard disk drive or a removable storage drive such as a floppy disk drive, optical disk drive, etc. The storage device can also use other similar means for loading computer programs or other instructions into the computer system. The computer system also includes a communication unit. The communication unit allows the computer to connect to other databases and the Internet through an I/O interface. The communication unit allows the transfer to, as well as reception of data from, other databases. The communication unit may include a modem, an Ethernet card, or any similar device which enables the computer system to connect to databases and networks such as LAN, MAN, WAN and the Internet. The computer system facilitates inputs from a user through an input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing, or a request made by another processing machine.

While the foregoing description is presented to enable a person of ordinary skill in the art to make and use the technique, and is provided in the context of the requirement for a obtaining a patent. The present description describes the best presently contemplated method for carrying out the present technique. Various modifications to the preferred embodiment will be readily apparent to those skilled in the art, and the generic principles of the present technique may be applied to other embodiments, and some features of the present technique may be used without the corresponding use of other features. Accordingly, the present technique is not intended to be limited to the embodiment shown but is to be accorded the widest scope consistent with the principles and features described herein.

What is claimed is:

1. A test system comprising:
a sequence processing module for receiving commands from a communications session, wherein the sequence processing module is operatively configured to communicate with a measurement capture and results database, a plurality of hardware modules, an RF switch fabric and a plurality of devices under test (DUTs), wherein the commands received from the communications session include commands for multiple ones of the plurality of hardware modules, and the sequence processing module parses the commands into ordered subsets of commands for respective intended ones of the plurality of hardware modules.

2. The test system of claim 1, wherein the sequence processing module comprises:
a global resource scheduler;
a measurement processor and sequence player operatively configured to communicate with the global resource scheduler;
a first plurality of hardware modules;
a second plurality of hardware modules, wherein each one of the second plurality of hardware modules is operatively configured to communicate with a respective one of the first plurality of hardware modules; and
an event register, wherein the measurement processor and sequence player is operatively configured to communicate with the first plurality of hardware modules and the event register, and wherein the event resister is operatively configured to communicate with the second plurality of hardware modules.

3. The test system of claim 2, wherein each of the second plurality of hardware modules comprises a respective FIFO register.

4. The test system of claim 2, wherein each of the first plurality of hardware modules is associated with a respective discrete hardware interface module (HWIM).

5. The test system of claim 2, wherein the global resource scheduler is configured to receive commands from the communications session.

6. The test system of claim 2, wherein the measurement processor and sequence player is operatively configured to communicate with the measurement capture and results database and one or more technology modules.

7. A method of testing a system comprising:
(a) issuing a sequence of commands into a test system;
(b) determining resource availability of the test system;
(c) parsing the sequence of commands into ordered subsets of commands for respective intended resources of the test system;
(d) passing on the ordered subsets of the sequence of commands to respective hardware modules of the test system resources as they become available;
(e) loading the ordered subsets of the sequence of commands in respective hardware resources of the test system;
(f) storing the ordered subsets of the sequence of commands in the respective hardware resources of the test system as an Event n;
(g) notifying the test system that the ordered subsets of the sequence of commands are loaded in the respective hardware resources;
(h) executing the ordered subsets of the sequence of commands in Event n.

8. The method of claim 7, further comprising:
(i) repeating steps (a)-(h) for additional sequences of commands automatically.

9. The method of claim 7, wherein the hardware resources are FIFO registers.

10. A test system comprising:
a sequence processing module for receiving commands from a communications session, wherein the sequence processing module comprises:
a global resource scheduler;
a measurement processor and sequence player operatively configured to communicate with the global resource scheduler by receiving and parsing commands for multiple ones of a plurality of hardware modules into ordered subsets of commands for respective intended ones of the plurality of hardware modules;
a first plurality of hardware modules, each of which is configured to receive a respective one of the ordered subsets of commands;
a second plurality of hardware modules, wherein each one of the second plurality of hardware modules is operatively configured to communicate with a respective one of the first plurality of hardware modules; and
an event register, wherein the measurement processor and sequence player is operatively configured to communicate with the first plurality of hardware modules and the event register, and wherein the event resister is operatively configured to communicate with the second plurality of hardware modules;
a measurement capture and results database operatively configured to communicate with the measurement processor and sequence player;
one or more technology modules operatively configured to communicate with the measurement processor and sequence player;
an RF switch fabric operatively configured to communicate with the second plurality of hardware modules; and
a plurality of devices under test (DUTs) operatively configured to communicate with the RF switch fabric.

11. The test system of claim 10, wherein each of the second plurality of hardware modules comprises a respective FIFO register.

12. The test system of claim 10, wherein each of the first plurality of hardware modules is associated with a respective discrete hardware interface module (HWIM).

* * * * *